UNITED STATES PATENT OFFICE 2,477,869

NITRO SULFONATES FROM BETA-NITRO ALKANOLS

Marvin H. Gold and Leonard J. Druker, Chicago, Ill., assignors to The Visking Corporation, Chicago, Ill., a corporation of Virginia No Drawing. Application October 3, 1946, Serial No. 701,056

17 Claims. (Cl. 260—513)

This invention relates to the preparation of nitro sulfonates. More particularly, it relates to a new and improved method of preparing β-nitro sulfonates of the following formula:

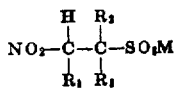

wherein $R_1$ represents hydrogen, halogen, alkyl, aryl, alkoxy or aryloxy group,
$R_2$ represents hydrogen, alkyl, aryl,
$R_3$ represents hydrogen, alkyl, aryl,
M represents hydrogen, a metallic ion, ammonium or N-substituted ammonium ion.

These nitro sulfonates are obtained, in general, according to this invention by reacting a β-nitro alcohol, in which the carbon atom attached to the nitro group also has at least one hydrogen, directly with an aqueous solution of a bisulfite having a pH of at least 5.4, and lowering the pH of the reaction mass to below 7 and preferably also above 5.4.

The precise mechanism of this reaction is not understood but in some manner the hydroxyl group of the nitro alcohol is directly replaced by sulfonic acid salt group, as shown by the following equation illustrating the reaction which takes place when 2-nitroethan-1-ol is added to an aqueous solution of ammonium bisulfite:

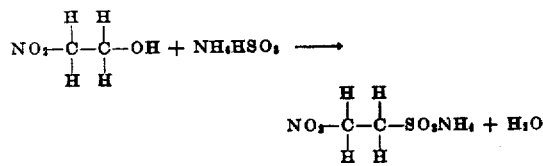

The term "β" (beta) as used herein defines the arrangement wherein the carbon atom attached to the nitro group is also attached to the carbon atom holding the sulfonate or hydroxy group, depending on whether the compound is a nitro sulfonate or a nitro alcohol, respectively.

Any saturated β-nitro alcohol in which the carbon holding the nitro group also has at least one hydrogen can be used in the process.

Preferably, the nitro alcohol has the following general structural formula:

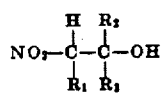

wherein:
$R_1$ represents hydrogen; alkyl, such as methyl, ethyl, propyl, etc.; aryl, such as phenyl, naphthyl, etc.; alkoxy, such as methoxy, ethoxy; or aryloxy, such as phenoxy and naphthoxy; halogen, such as chlorine, bromine, iodine;

$R_2$ represents hydrogen; alkyl, such as methyl, ethyl, propyl, etc.; aryl, such as phenyl, naphthyl, etc.;
$R_3$ represents hydrogen; alkyl, such as methyl, ethyl, propyl, etc.; aryl, such as phenyl, naphthyl, etc.;

As illustrative specific nitro alcohols which can be used in the process are the following:

2-nitroethan-1-ol
2-nitrobutan-1-ol
1-phenyl-2-nitroethan-1-ol
1-nitropentan-2-ol
1-nitro-octan-2-ol
1-nitropropan-2-ol
1-nitrobutan-2-ol
2-nitrobutan-3-ol
2-methoxy-2-nitroethan-1-ol
2-phenoxy-2-nitroethan-1-ol
1-phenyl-2-nitrobutan-1-ol
2-phenyl-1-chloro-1-nitro-propan-2-ol
1-chloro-1-nitroamyl-2-ol
1-chloro-1-nitroethan-2-ol The β-nitro alcohol can also be a cyclic (aliphatic) compound wherein the cyclo aliphatic group can be cyclopropyl, cyclobutyl, cycloheptyl, cyclopentyl, cyclohexyl, etc. 1-cyclopentyl-2-nitroethan-1-ol, 2-cyclohexyl-2-nitroethan-1-ol are illustrative specific examples of the cyclic nitro alcohols.

The bisulfite which is utilized in the process can be any metal, ammonium, or N-substituted ammonium bisulfite which is water-soluble. Alkali metal bisulfites (such as sodium bisulfite and potassium bisulfite), calcium bisulfite, magnesium bisulfite, zinc bisulfite, etc., are illustrative metal bisulfites which can be used in the process. Illustrative N-substituted ammonium ions are the ionic form of the following:

Any alkaloid,
Methyl ammonium,
Dimethyl ammonium,
Trimethyl ammonium,
Methyl dibenzyl ammonium,
Dimethyl benzyl ammonium,
Diethyl phenyl ammonium,
Cetyl dimethyl ammonium,
Quinolinium,
Pyridinium,
Morpholine,
N-methyl morpholine,
Ethyl diethanol ammonium,
Triethanol ammonium,
Piperidinium,
N-methyl piperidinium,
etc.

In general, the pH of the aqueous solution of the selected bisulfite must be at least 5.4. When the selected aqueous bisulfite solution is of a pH lower than 5.4, no reaction is obtained.

The alkalinity of the reaction mixture increases so that the pH of the reaction mixture rises as the reaction proceeds. When an aqueous solution of a sulfite, such as sodium or potassium sulfite and which has a pH within the range of about 9.5 to 10, is reacted with a nitro alcohol, only the enol sulfonate double salt is obtained. When the pH of the bisulfite solution is such that the pH of the reaction mixture rises above about 7.5, the tendency toward enol salt formation becomes increasingly stronger. In order to assure that the product does not contain any enol salt or tendency to form such salt, the pH of the reaction mixture at the completion of the reaction is lowered to below 7, such as, for example, between 6 and 7. The lowering of the pH can be obtained by acidifying the reaction mixture, such as preferably with sulfur dioxide.

The process can be practiced either by adjusting the pH of the bisulfite solution prior to the reaction or by maintaining the pH of the reaction mixture. In the latter process, the nitro alcohol can be continuously added to an aqueous solution of the selected bisulfite held at the desired pH, such as between 6 and 7, by adding sulfur dioxide and the required base (metal oxide, metal hydroxide, ammonia, or N-substituted ammonia) at such a ratio as to maintain the pH between 6 and 7 at a rate equivalent to the added nitro alcohol. By continuously removing a portion of the reaction mixture to separate the crystalline product therefrom and returning the resultant filtrate in a continuous manner to the reaction mixture, the process can be made continuous.

In that embodiment wherein the pH of the bisulfite solution is adjusted prior to the reaction, the pH can be adjusted to such a value so that at the end of the reaction the pH of the reaction mixture is above 5.4 and below 7, in which event it is not necessary to lower the pH of the reaction mixture. If the pH of the bisulfite solution prior to the reaction is such that at the end of the reaction the pH of the reaction mixture is above about 7.5, then the pH of the reaction mixture is lowered to below 7.

In the preferred embodiment of the invention, an aqueous solution of the selected bisulfite having a pH of between 6 and 7 is utilized and, after the reaction has gone to completion, the pH of the reaction mixture is reduced to less than 7 in order to make sure all the product is in the form of the normal salt rather than the enol double salt.

The precise pH to which the reaction mass is reduced (below 7) is not critical. However, in order to be able to re-use the filtrate in the process, the pH of the solution must be at least 5.4, and therefore the reaction mass is adjusted to a pH value above 5.4, such as preferably between 6 and 7.

Herein, wherever pH values are referred to, it is to be understood that they were determined electrometrically with a glass electrode. In general, when the pH of the bisulfite solution is increased, it is accomplished by means of bases corresponding to the cation of the bisulfite being used and, when it is decreased, it is effected by acids or anhydrides corresponding to the anion of the bisulfite used.

Theoretically, the bisulfite and nitro alcohol react in stoichiometric proportions. In practice, however, a slight excess of bisulfite is utilized, though of course the reactants may be used in the stoichiometric proportions required for the reaction, or the nitro alcohol may be used in excess of the stoichiometric proportions required for the reaction.

The reaction is generally exothermic and requires external cooling to maintain it at optimum temperatures. $\beta$-nitro alcohols of lower molecular weight react with bisulfites at a lower temperature than those of higher molecular weight. Though in the preferred operation of the process the reaction is carried out at a temperature between 10° C. and 80° C., it is to be understood, however, that temperatures higher than 80° C. and lower than 10° C. can also be used.

The manner and details of practicing the invention will become more apparent from the specific examples hereinafter set forth, it being understood that the invention is not restricted to such specific examples which are set forth as illustrative embodiments only. In the examples, the proportions are parts by weight, and the temperatures are the uncorrected centigrade thermometer readings.

EXAMPLE I

*Preparation of potassium 2-nitroethane-1-sulfonate*

A solution of potassium bisulfite was prepared by dissolving 112 grams of solid potassium hydroxide in 150 milliliters of water and passing in sulfur dioxide gas until the pH was between 6 and 7. Then, while keeping the solution at 30° C., 91 grams of crude 2-nitroethan-1-ol was added dropwise with stirring. The product separated out during the addition. After completion of the addition, sulfur dioxide gas was introduced until the pH was between 6 and 7. The mixture was cooled in a salt-ice bath, and 120 grams of potassium 2-nitroethane-1-sulfonate was obtained by filtration.

EXAMPLE II

*Preparation of potassium 2-nitrobutane-1-sulfonate*

A solution of potassium bisulfite was prepared by treating a solution of 112 grams potassium hydroxide in 150 milliliters of water with sulfur dioxide gas until a pH between 6 and 7 was reached. Then 119 grams of 2-nitrobutan-1-ol was added dropwise with stirring to the bisulfite solution held at 40°–50° C. After about an hour, the resulting mixture was treated with sulfur dioxide to bring the pH to between 6 and 7. The mixture was then cooled in an ice bath, and 173 grams of potassium 2-nitrobutane-1-sulfonate was obtained by filtration. The filtrate was extracted with ether and the crude solid washed with ether. The combined ether portions yielded 5 grams of unreacted nitro alcohol. The filtrate containing additional product and inorganic salts could be fractionally crystallized to obtain more of the desired product.

EXAMPLE III

*Preparation of ammonium 2-nitrobutane-1-sulfonate*

In a reaction vessel, equipped with a stirrer, reflux condenser, thermometer and dropping funnel, was placed a 30% solution of ammonium bisulfite (pH between 6 and 7). Then 119 grams of 2-nitrobutan-1-ol was added dropwise with stirring to the bisulfite solution held at 40°–50° C. After two hours, the resulting mixture was treated with sulfur dioxide until the pH was between 6 and 7. The mixture was then cooled with an ice bath, and 187 grams of ammonium 2-nitrobutane-1-sulfonate was obtained by filtration. The crude product was washed with ether, and the filtrate extracted with ether. The combined ether portions yielded 8 grams of unreacted nitro alcohol.

EXAMPLE IV

*Preparation of ammonium 1-phenyl-2-nitroethane-1-sulfonate*

In a reaction vessel, equipped with a stirrer, reflux condenser, thermometer and a dropping funnel, was placed 250 milliliters of a 25% ammonium bisulfite solution (pH between 6 and 7). Then, while stirring at 45° C., 130 grams of crude 1-phenyl-2-nitroethan-1-ol was added dropwise over a period of an hour. The resulting mixture was treated with sulfur dioxide gas until the pH was between 6 and 7. The mixture was then cooled with a salt-ice bath, yielding 230 grams of crude product which contained a considerable amount of inorganic material. Recrystallization from water and alcohol yielded pure ammonium 1-phenyl-2-nitroethane-1-sulfonate.

EXAMPLE V

*Preparation of potassium 1-nitropentane-2-sulfonate*

A solution of potassium bisulfite was prepared by dissolving 112 grams of solid potassium hydroxide in 150 milliliters of water and passing in sulfur dioxide gas until the pH was between 6 and 7. Then, while stirring at 50°–60° C., 133 grams of 1-nitropentan-2-ol was added dropwise with stirring. After several hours, sulfur dioxide gas was introduced until the mixture was neutral to litmus. The mixture was cooled in an ice bath, and 12 grams of crude product containing a considerable amount of inorganic material was obtained by filtration. A large excess of ethyl alcohol was added to the filtrate which yielded more crude product. The combined crude material was then extracted with ethyl alcohol in a Soxhlet extractor. The alcohol solution yielded the very hygroscopic potassium 1-nitropentane-2-sulfonate.

EXAMPLE VI

*Preparation of potassium 1-nitro-octane-2-sulfonate*

A solution of potassium bisulfite was prepared by dissolving 32 grams of solid potassium hydroxide in 100 milliliters of water and passing in sulfur dioxide gas until the pH was between 6 and 7. Then, while keeping the solution at 50°–60° C., 50 grams of 1-nitro-octan-2-ol was added dropwise with stirring. After about an hour, the resulting mixture was treated with sulfur dioxide to bring the pH to between 6 and 7. The mixture was cooled in an ice bath and then precipitated by adding a large excess of ethyl alcohol. The crude solid was extracted in a Soxhlet extractor with ethyl alcohol. The hygroscopic potassium-1-nitro-octane-2-sulfonate was obtained from the alcohol solution.

The invention is not restricted to the preparation of the specific nitro sulfonates of the examples. In general, the process can be used for preparing β-nitro sulfonates having the general formula:

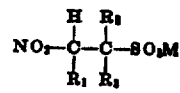

wherein:

$R_1$, $R_2$ and $R_3$ are the respective groups originally in the β-nitro alcohol, which was one of the reactants, and M is the metal, ammonium, or N-substituted ammonium ion of the bisulfite, which was the other reactant.

The nitro sulfonates which are prepared by the process of this invention are useful as intermediates for chemical synthesis, and also, in certain cases, may find uses as wetting, detergent, or emulsifying agents.

The invention provides a simple process of directly reacting a β-nitrol alcohol with a bisulfite to produce β-nitrol sulfonates in relatively high yields.

Since it is obvious that various changes and modifications may be made in the above description without departing from the nature or spirit thereof, this invention is not restricted thereto except as set forth in the appended claims.

We claim:

1. A process of preparing β-nitrol sulfonates which comprises directly replacing the hydroxyl group in a saturated β-nitrol alcohol in which the carbon atom to which the nitrol group is attached also carries at least one hydrogen by a sulfonic acid salt group by reacting said nitro alcohol with an aqueous solution of a bisulfite having a pH of at least 5.4, said bisulfite being selected from the class which consists of water-soluble metal bisulfites, ammonium bisulfite, and N-substituted ammonium bisulfites.

2. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH of at least 5.4, said bisulfite being selected from the class which consists of water-soluble metal bisulfites, ammonium bisulfite, and N-substituted ammonium bisulfites.

3. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting said nitro alcohol with an aqueous solution of a bisulfite having a pH of at least 5.4 and such as will produce, at the end of the reaction, a reaction mixture having a pH below 7, and separating the nitro sulfonate from the reaction mixture, said bisulfite being selected from the class which consists of water-soluble metal bisulfites, ammonium bisulfite, and N-substituted ammonium bisulfites.

4. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH of at least 5.4 and such as will produce, at the end of the reaction, a reaction mixture having a pH below 7, and separating the nitro sulfonate from the reaction mixture, said bisulfite being selected from the class which consists of water-soluble metal bisulfites, ammonium bisulfite, and N-substituted ammonium bisulfites.

5. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting said nitro alcohol with an aqueous solution of a bisulfite having a pH of at least 5.4 and such as will produce, at the end of the reaction, a reaction mixture having a pH above about 7.5, lowering said pH of the reaction mixture to below 7, and thereafter separating the nitro sulfonate from the reaction mixture, said bisulfite being selected from the class which consists of water-soluble metal bisulfites, ammonium bisulfite, and N-substituted ammonium bisulfites.

6. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting said nitro alcohol with an aqueous solution of a bisulfite having a pH of at least 5.4 and such as will produce, at the end of the reaction, a reaction mixture having a pH above about 7.5, lowering said pH of the reaction mixture to below 7 and above 5.4, and thereafter separating the nitro sulfonate from the reaction mixture, said bisulfite being selected from the class which consists of water-soluble metal bisulfites, ammonium bisulfite and N-substituted ammonium bisulfites.

7. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH of at least 5.4 and such as will produce, at the end of the reaction, a reaction mixture having a pH above about 7.5, lowering said pH of the reaction mixture to below 7, and thereafter separating the nitro sulfonate from the reaction mixture, said bisulfite being selected from the class which consists of water-soluble metal bisulfites, ammonium bisulfite, and N-substituted ammonium bisulfites.

8. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH of at least 5.4 and such as will produce, at the end of the reaction, a reaction mixture having a pH above about 7.5, lowering said pH of the reaction mixture to below 7 and above 5.4, and thereafter separating the nitro sulfonate from the reaction mixture, said bisulfite being selected from the class which consists of water-soluble metal bisulfites, ammonium bisulfite and N-substituted ammonium bisulfites.

9. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH between 6 and 7, lowering the pH of the reaction mixture at the end of the reaction to below 7, and thereafter separating the nitro sulfonate from the reaction mixture, said bisulfite being selected from the class which consists of water-soluble metal bisulfites, ammonium bisulfite, and N-substituted ammonium bisulfites.

10. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH between 6 and 7, lowering the pH of the reaction mixture at the end of the reaction to below 7 and above 5.4, and thereafter separating the nitro sulfonate from the reaction mixture, said bisulfite being selected from the class which consists of water-soluble metal bisulfites, ammonium bisulfite, and N-substituted ammonium bisulfites.

11. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH between 6 and 7, lowering the pH of the reaction mixture at the end of the reaction to between 6 and 7, and thereafter separating the nitro sulfonate from the reaction mixture, said bisulfite being selected from the class which consists of water-soluble metal bisulfites, ammonium bisulfite, and N-substituted ammonium bisulfites.

12. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH between 6 and 7, lowering the pH of the reaction mixture at the end of the reaction to below 7, and thereafter separating the nitro sulfonate from the reaction mixture, said bisulfite being selected from the class which consists of water-soluble metal bisulfites, ammonium bisulfite, and N-substituted ammonium bisulfites.

13. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH between 6 and 7, lowering the pH of the reaction mixture at the end of the reaction to below 7 and above 5.4, and thereafter separating the nitro sulfonate from the reaction mixture, said bisulfite being selected from the class which consists of water-soluble metal bisulfites, ammonium bisulfite, and N-substituted ammonium bisulfites.

14. A process of preparing β-nitro sulfonates which comprises directly replacing the hydroxyl group in a saturated β-nitro alcohol in which the carbon atom to which the nitro group is attached also carries at least one hydrogen by a sulfonic acid salt group by reacting, at a temperature between 10° C. and 80° C., said nitro alcohol with an aqueous solution of a bisulfite having a pH between 6 and 7, lowering the pH of the reaction mixture at the end of the reaction to between 6 and 7, and thereafter separating the nitro sulfonate from the reaction mixture, said bisulfite being selected from the class which consists of water-soluble metal bisulfites, ammonium bisulfite, and N-substituted ammonium bisulfites.

15. A process of preparing potassium-2-nitro-octane-1-sulfonate which comprises directly replacing the hydroxyl group in 1-nitro-octane-2-ol by a sulfonic acid salt group by reacting, at a temperature between 50° C. and 60° C., said nitro alcohol with an aqueous solution of potassium bisulfite having a pH between 6 and 7, treating the reaction mixture at the end of the reaction with sulfur dioxide gas until the pH is between 6 and 7, and thereafter separating the nitro sulfonate from the reaction mixture.

16. A process of preparing ammonium-2-nitrobutane-1-sulfonate which comprises directly replacing the hydroxyl group in 2-nitrobutan-1-ol by a sulfonic acid salt group by reacting, at a temperature between 40° C. and 50° C., said nitro alcohol with an aqueous solution of ammonium bisulfite having a pH between 6 and 7, treating the reaction mixture at the end of the reaction with sulfur dioxide gas until the pH is between 6 and 7, and thereafter separating the nitro sulfonate from the reaction mixture.

17. A process of preparing potassium-1-nitropentane-2-sulfonate which comprises directly replacing the hydroxyl group in 1-nitropentan-2-ol by a sulfonic acid salt group by reacting, at a temperature between 50° C. and 60° C., said nitro alcohol with an aqueous solution of potassium bisulfite having a pH between 6 and 7, treating the reaction mixture at the end of the reaction with sulfur dioxide gas until said mixture is neutral to litmus, and thereafter separating the nitro sulfonate from the reaction mixture.

MARVIN H. GOLD.
LEONARD J. DRUKER.

REFERENCES CITED

The following references are of record in the file of this patent:

UNITED STATES PATENTS

| Number | Name | Date |
|---|---|---|
| 2,171,117 | Schrauth et al. | Aug. 29, 1939 |

FOREIGN PATENTS

| Number | Country | Date |
|---|---|---|
| 343,872 | Great Britain | 1931 |
| 571,157 | Great Britain | 1945 |

OTHER REFERENCES

Kharasch et al., J. Org. Chem., vol. 3, pp. 175–192 (1938).